United States Patent [19]

Okamoto et al.

[11] Patent Number: 4,694,419
[45] Date of Patent: Sep. 15, 1987

[54] PROGRAMMABLE CONTROLLER WITH DIRECT TO PLANT ADDRESSING

[75] Inventors: Tadashi Okamoto, Hitachi; Kazuhiko Shimoyama, Katsuta; Hiromasa Yamaoka, Hitachi; Mitsuro Takakura, Katsuta, all of Japan

[73] Assignee: Hitachi, Ltd., Tokyo, Japan

[21] Appl. No.: 658,025

[22] Filed: Oct. 5, 1984

[30] Foreign Application Priority Data

Oct. 6, 1983 [JP] Japan .................................. 58-185832

[51] Int. Cl.[4] ........................ G05B 11/01; G06F 9/34
[52] U.S. Cl. ..................................... 364/900; 364/140
[58] Field of Search ... 364/200 MS File, 900 MS File, 364/140, 141

[56] References Cited

U.S. PATENT DOCUMENTS

| 4,031,514 | 6/1977 | Kihara | 364/200 |
| 4,200,927 | 4/1980 | Hughes et al. | 364/200 |
| 4,451,884 | 5/1984 | Heath et al. | 364/200 |

Primary Examiner—Archie E. Williams, Jr.
Assistant Examiner—Michael J. Ure
Attorney, Agent, or Firm—Antonelli, Terry & Wands

[57] ABSTRACT

A programmable controller for controlling a plant on the basis of a stored program includes a processing unit for reading out an instruction from a program memory to process the instruction. In the processing unit, it is determined whether the instruction read out from the memory is an instruction taking a register-modified addressing mode or an instruction taking a direct addressing mode. When the read-out instruction is an instruction taking the direct addressing mode, a plant is directly addressed by the address part of the instruction. Then, an arithmetic operation is performed using the state information which is read out from the plant thus addressed, or plant control information is sent from the processing unit to the plant thus addressed.

5 Claims, 7 Drawing Figures

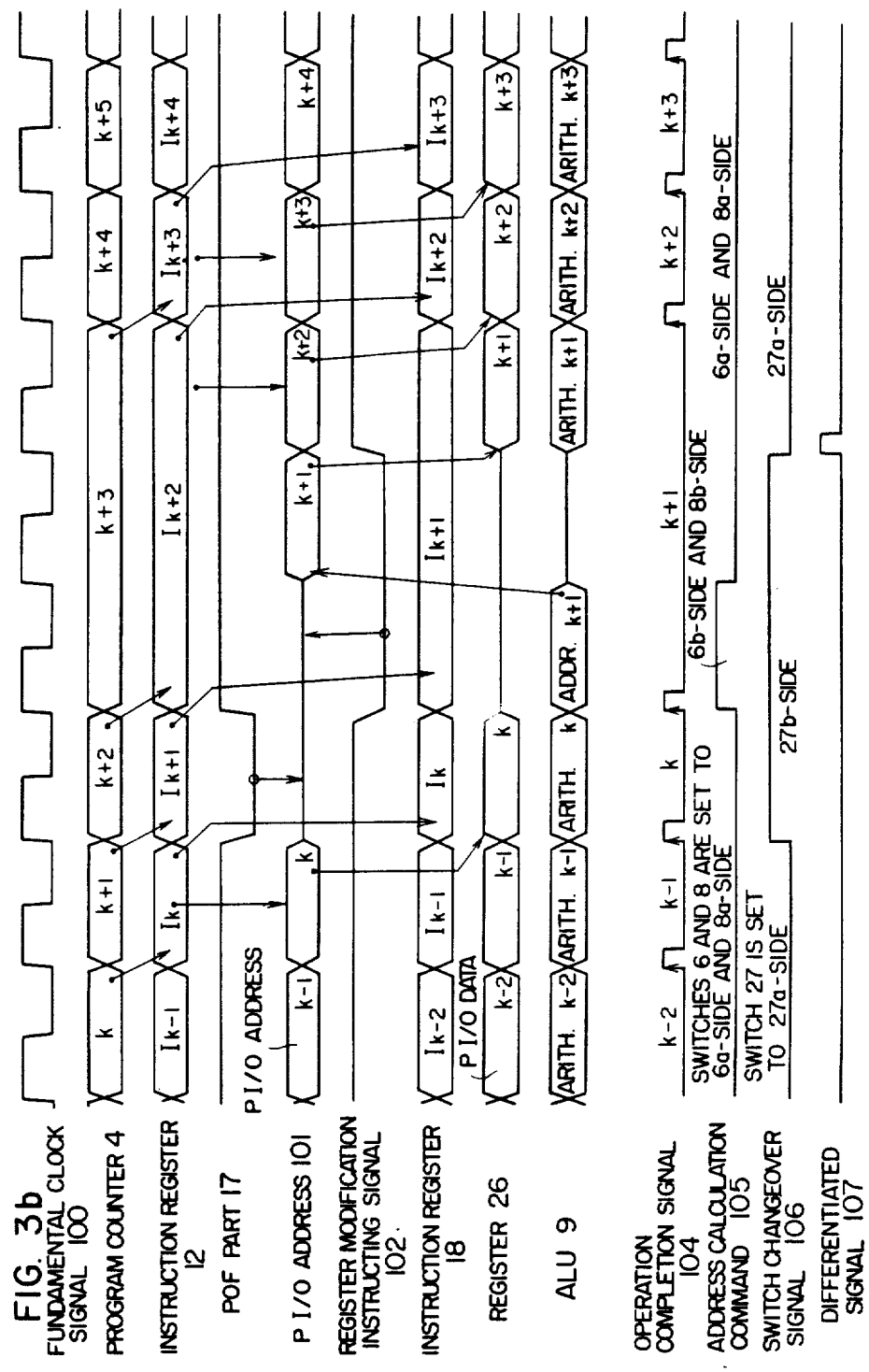

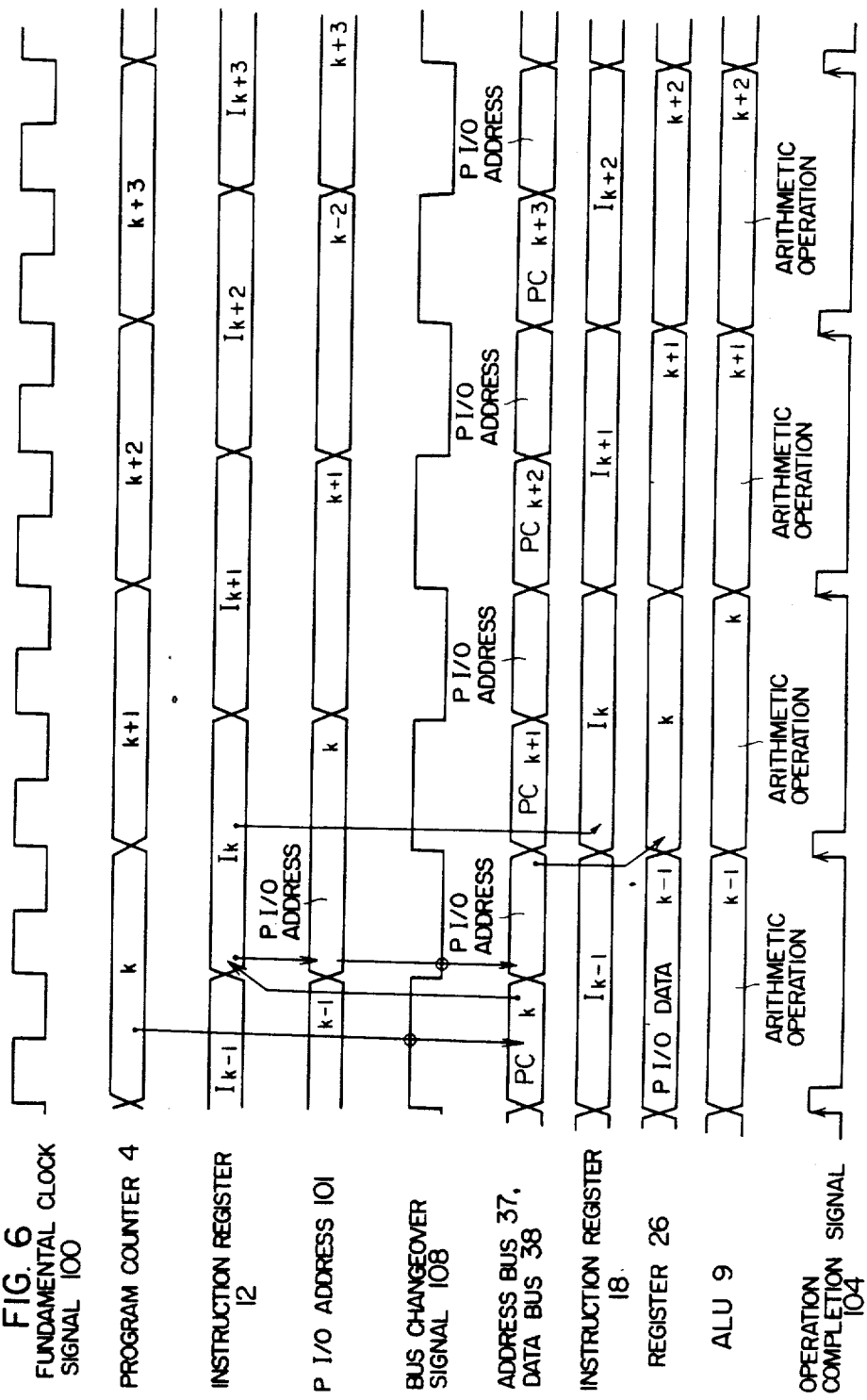

PROGRAMMABLE CONTROLLER WITH DIRECT TO PLANT ADDRESSING

FIELD OF THE INVENTION

The present invention relates to a programmable controller, and more particularly to a programmable controller suitable for use in plant control which is required to have a high processing speed and a high-level function.

DESCRIPTION OF THE PRIOR ART

In order to control various plants, a programmable controller includes the function of a sequencer, which performs a logical operation for logically controlling a plant, and an arithmetic means for performing a numerical calculation. The term "programmable" means that users can change the processing procedure (for example, the plant control procedure) in the controller.

The interface of such a programmable controller to plants is formed of a process input/output unit (hereinafter referred to as "P I/O"). In many cases, an address in the P I/O viewed from the processing unit of the programmable controller indicates an element in the plant to be controlled, for example, an electric motor included in the plant. Accordingly, when the processing unit reads out a control instruction from a memory to control the plant, the address indicated by the address part of the instruction can be very often used as the address in the P I/O, without being modified. In the case where it is not plant control but general data processing which is carried out by a computer, the address indicated by the address part of an instruction which has been read out from a memory is often modified to obtain a desired address. In a programmable controller, address modification is carried out, for example, when the operation system of the controller is processed. The term "address modification" indicates that the address part of an instruction (or command) is not used for a desired address, directly, but the desired address is formed by modifying the address part in accordance with an index indicated by the modification part of the instruction (or command). Generally speaking, address modification refers to the processing for adding the contents of the index to the address part.

In a conventional programmable controller, an instruction requiring address modification (namely, an instruction which takes a register-modified addressing mode) and an instruction capable of carrying out direct addressing (namely, an instruction which takes a direct addressing mode) are both treated as an instruction taking the register-modified addressing mode, in order to unify instruction processing. That is, as regards an instruction which does not require address modification, a register in which a value of "0" is written, is specified as an index register, and a desired address is formed by adding "0" to the address part of the instruction.

A digital controller for controlling a process in accordance with a program is proposed in a application Ser. No. 582,541, now U.S. Pat. No. 4,628,436. In this controller, an operand address is specified by an instruction in the indirect addressing method. That is, the address of an operand is read out of an operand address memory at the address indicated by the address part of an instruction which has been read out of an instruction memory, and the operand is specified by the address read out of the operand address memory.

In U.S. Pat. No. 4,228,497, there is proposed a microprogrammed data processor provided with a plurality of stages for carrying out pipeline processing to increase throughput. In this processor, an address for writing and transferring data at each stage is given from a source different from an instruction, and is determined in the indirect addressing method. If the above data processor is used for plant control, all of the write-in and readout instructions for a P I/O will be processed in the indirect addressing method.

As shown in the above examples, in the prior art, an arithmetic operation for address modification is performed even when the write-in and read-out instructions for the P I/O can be processed in the direct addressing method, and thus the processing time at a processing unit is undesirably extended. Therefore, there arises a problem that the processing speed of the processing unit or programmable controller becomes low. Further, there arises another problem that a heavy burden is cast on the arithmetic circuit included in the processing unit.

An object of the present invention is to provide a programmable controller which can solve the above-mentioned problems of the prior art and has an improved processing speed.

In a programmable controller according to the present invention, it is determined by a processing unit whether an instruction read out of a memory is an instruction requiring address modification (namely, an instruction taking the register-modified addressing mode) or an instruction capable of performing direct addressing without requiring address modification (namely, an instruction taking the direct addressing mode), and when the read-out instruction is of the direct addressing mode, an address indicated by the address part of the instruction is not sent to an arithmetic circuit but is directly used for specifying that address in a P I/O where information is received or transmitted.

SUMMARY OF THE INVENTION

In most of process control operations, the direct addressing method can be used. Accordingly, the processing speed of a programmable controller can be improved by the present invention. In more detail, the above improvement in processing speed can be realized by additionally providing a few circuit parts for determining the addressing mode of an instruction and for performing associated operations.

BRIEF DESCRIPTION OF THE DRAWING

Other features and advantages of the present invention will be apparent from the following description taken in conjunction with the accompanying drawings, in which:

FIGS. 3a and 3b are time charts for explaining the operation of the embodiment shown in FIG. 2;

FIG. 6 is a time chart for explaining the operation of the embodiment shown in FIG. 5.

DESCRIPTION OF THE PREFERRED EMBODIMENTS

Figure 1:
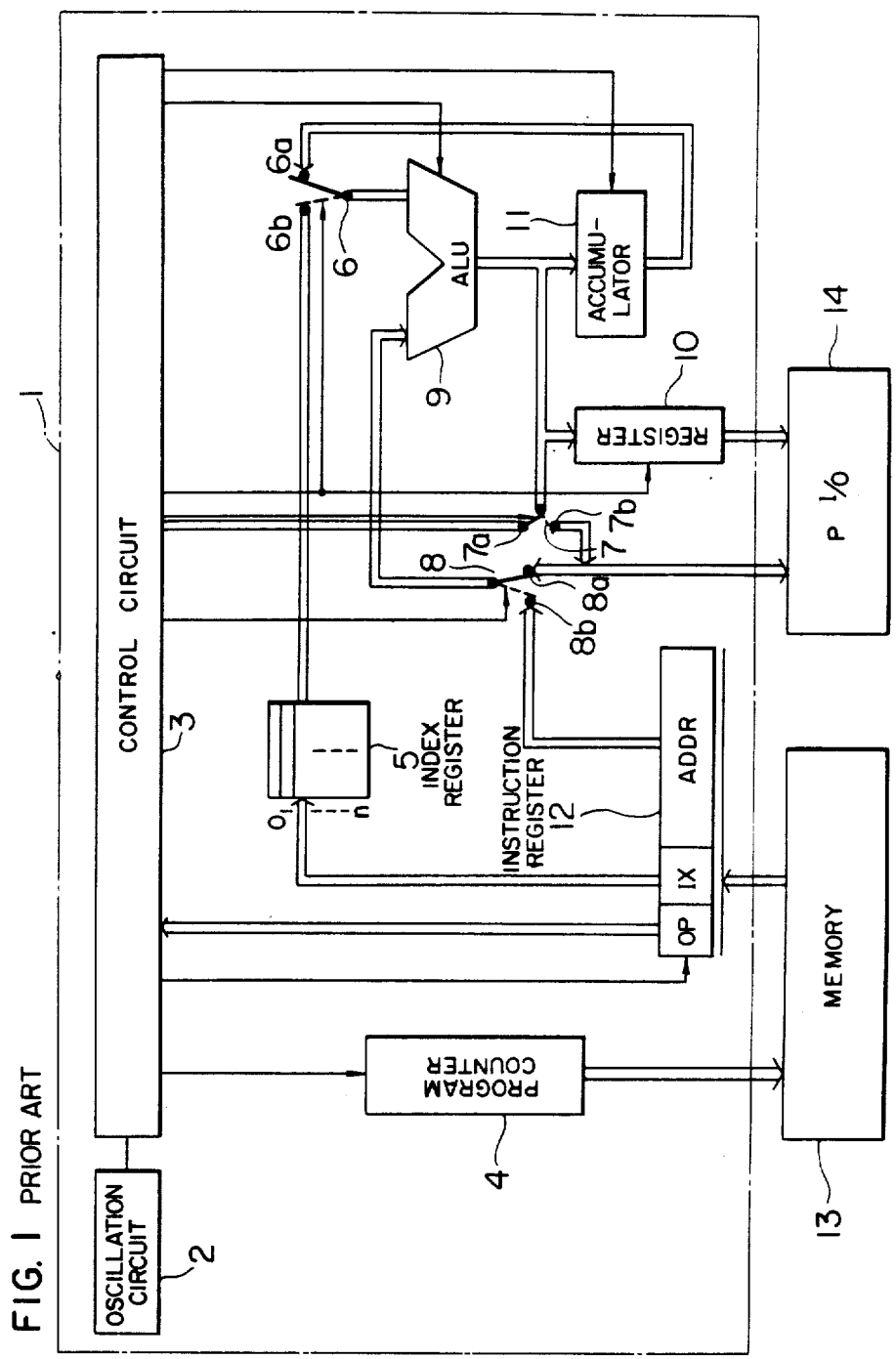
FIG. 1 is a block diagram showing a conventional programmable controller.

Prior to explaining embodiments of the present invention, a conventional programmable controller will be explained below. FIG. 1 shows the construction of an example of the conventional programmable controller. The programmable controller shown in FIG. 1 is made up of a central processing unit (hereinafter referred to as "CPU") 1, a memory 13 for storing therein a program, and a P I/O 14 for interfacing the CPU 1 to a process. The CPU 1 includes an oscillation circuit 2, a control circuit 3, a program counter 4, index registers 5, switches 6, 7 and 8, an arithmetic and logic unit (hereinafter referred to as "ALU") 9, an address register 10, an accumulator 11, and an instruction register 12.

The oscillation circuit 2 generates a fundamental clock signal, which is used for determining various timing. The control circuit 3 performs various control operations mainly by decoding the program.

The program counter 4 receives a count-up (or count-down) signal from the control circuit 3, and counts to determine that address in the program which is used in the next step. In other words, the contents of the program counter 4 indicate an address, at which a desired instruction is contained in the program. When an address in the program memory 13 is specified by using the program counter 4, the address may be specified directly by the contents of the program counter 4 (that is, in a direct addressing method) or may be specified in such a manner that the contents of the program counter 4 are decoded and the result of decoding is used as the address (that is, in an indirect addressing method).

The program memory 13 stores therein a program for controlling a process, and sends an instruction at an address specified by the program counter 4, to the instruction register 12 of the CPU 1.

The instruction register 12 temporarily stores therein an instruction which is read out of the program memory 13 in accordance with the contents of the program counter 4. The instruction has an operation code part (namely, an OP part), an index part (namely, an IX part), and an address part (namely, an ADDR part), which are stored in OP, IX and ADDR parts of the instruction register 12, respectively.

The OP part of the instruction is sent from the register 12 to the control circuit 3, to be decoded therein. The control circuit 3 performs a desired control operation in accordance with the result of decoding. The switches 6 and 8 are set to a 6a-side and an 8a-side, respectively, or a 6b-side and an 8b-side, respectively, under the control of the control circuit 3. When the switch 6 is set to the 6a-side, the contents of the accumulator 11 are selectively applied to the ALU 9. When the switch 6 is set to the 6b-side, the contents of a specified index register 5 are selectively applied to the ALU 9. When the switch 8 is set to the 8a-side, the output of the P I/O 14 (that is, an operand) is selectively applied to the ALU 9. When the switch 8 is set to the 8b-side, the contents of the ADDR part of the instruction register 12 are selectively applied to the ALU 9.

The index registers 5 are a group of registers whose addresses are specified by the IX part of the instruction, and store therein values for address modification.

The ALU 9 is applied with outputs from the switches 6 and 8, and performs various arithmetic operations under the control of the control circuit 3. The arithmetic operations include addition, subtraction, and others.

The switch 7 is set to a 7a-side or 7b-side under the control of the control circuit 3. When an operand is read out of the P I/O 14, the switch 7 is set to the 7a-side. When a control signal is sent to the P I/O 14, the switch 7 is set to the 7b-side.

The ALU 9 adds the contents of the ADDR part of the instruction register 12 to the contents of the index register 5 specified by the IX part of the instruction register 12, at each of instructions for transferring information between the CPU 1 and P I/O 14, and the result of addition is sent, as an address in the P I/O 14, to the address register 10. However, in the case where the ALU 9 performs an arithmetic operation for forming data, the result of the arithmetic operation is sent to the accumulator 11. When it is desired to specify the address of an operand only by the ADDR part of an instruction, an index register 5 in which a value of "0" is previously written, is specified by the IX part of the instruction register 12. In the case where an operand is required, the operand is read out of the P I/O 14 at an address specified by the address register 10, and then sent to the ALU 9 through the switch 8 While, in the case where control information is to be outputted, the contents of the accumulator 11 are sent to that address in the P I/O 14 which is specified by the address register 10, through the ALU 9 and switch 7.

As is evident from the above, in the conventional programmable controller, an address in the P I/O is specified by modifying the ADDR part of an instruction, even when the ADDR part can be used directly as the address. Accordingly, the processing time of the CPU becomes long, and moreover a heavy burden is cast on the ALU.

Now, a programmable controller according to the present invention will be explained.

Figure 2:
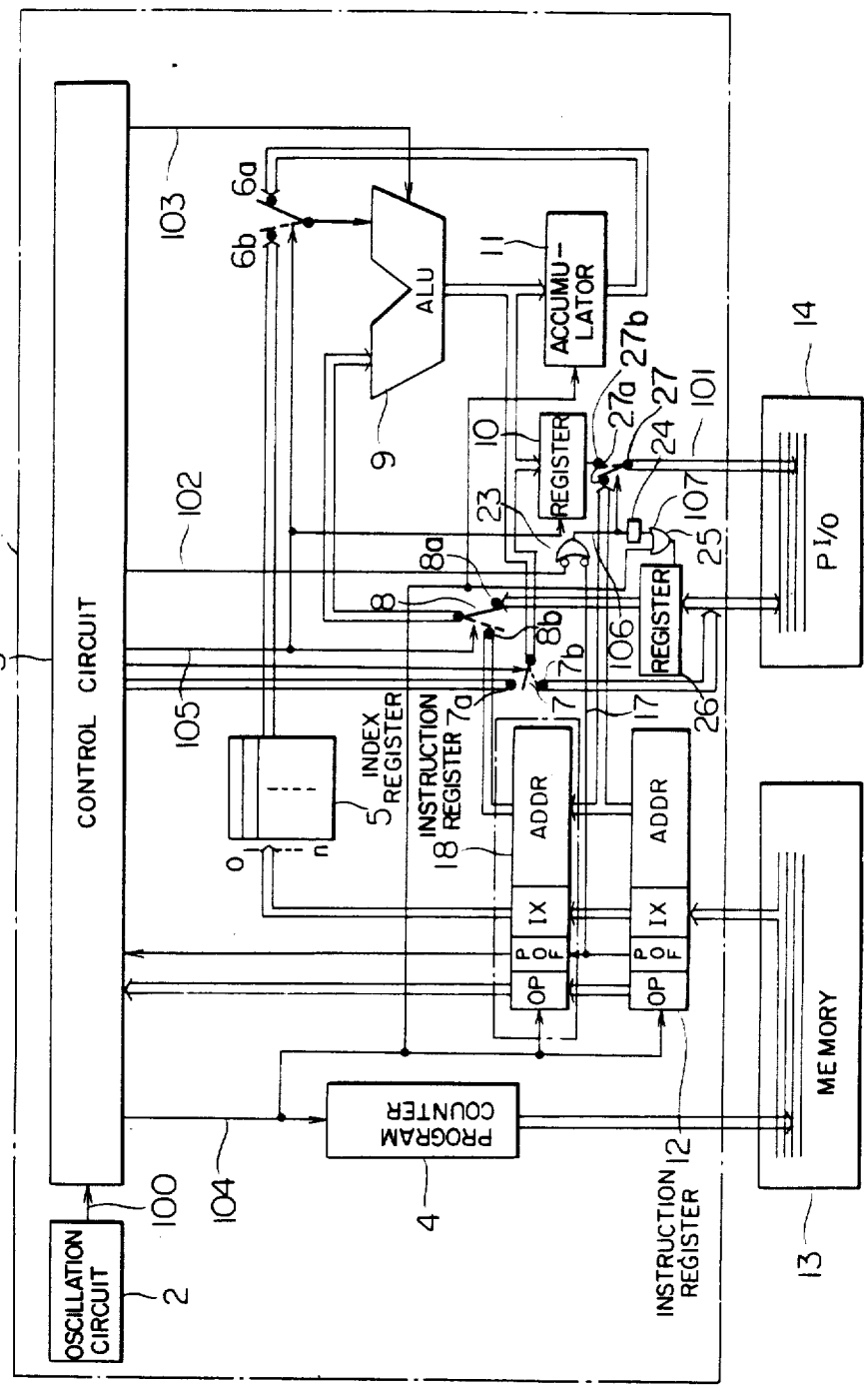
FIG. 2 is a block diagram showing an embodiment of a programmable controller according to the present invention.

FIG. 2 shows the construction of an embodiment of a programmable controller according to the present invention. In FIGS. 2 to 6, the same reference numerals as in FIG. 1 designate like parts or elements. The embodiment shown in FIG. 2 is different from the prior art in that an instruction used in the present embodiment has a POF part for determining whether the instruction takes the direct addressing mode or not, and the instruction register has a part for storing the POF part of the instruction. In FIG. 2, the CPU 1 includes an instruction register 18 which is surrounded by dot-dash lines, in addition to the instruction register 12. However, the instruction register 18 may be omitted. The construction shown in FIG. 2 is further different from that shown in FIG. 1, in that a data register 26, a NAND gate 23 which actually functions as an OR gate, an OR gate 25, a differentiating circuit 24, and a switch 27 are additionally provided. All circuit elements shown in FIG. 2 except the circuit elements 23, 24, 25, 26 and 27 are the same as those shown in FIG. 1.

The POF part of each instruction register includes a single bit. When the POF part has a value of "1", it is indicated that the instruction takes the direct addressing mode. When the POF part has a value of "0", the instruction takes the register-modified addressing mode.

Since the program counter 4, index registers 5, and others have been explained by reference to FIG. 1, explanation thereof will be omitted.

Now, the operation of the embodiment of FIG. 2 in the case where the instruction register 18 is omitted, will be explained with reference to the time chart shown in FIG. 3a. The above operation is advanced on the basis of a fundamental clock signal 100 from the oscillation circuit 2. Now, let us suppose that a k-th address is set in the program counter 4. When a signal 104 for indicating the completion of an arithmetic operation (hereinafter referred to as a "calculation completion signal") is sent out from the control circuit 3, an instruction $I_k$ at the k-th address of the program memory 13 is set in the instruction register 12.

In the case where the instruction $I_k$ is of the direct addressing mode type, the POF part of the instruction takes a level of "1". This level appears on a signal line 17, and is inverted by the NAND gate 23. Thus, a level of "0" is applied, as a control signal, to the switch 27, and the switch 27 is set to a 27a-side. It is to be noted that a register modification instruction signal 102 applied from the control circuit 3 to the NAND gate 23 takes a level of "1" when the instruction takes the direct addressing mode, and the NAND gate 23 takes the logical sum of the inverted versions of the signal 102 and an output signal from the POF part of the instruction register 12. When the switch 27 is set to the 27a-side, the contents of the ADDR part of the instruction register 12 are sent, as a P I/O address 101 (namely, an address in the P I/O 14), to the P I/O 14. In the P I/O 14, such an address signal is applied to a common bus which is connected to each plant. When state information from a plant, that is, an operand is read out of the P I/O 14, information from a plant specified by the P I/O address 101 is set in the register 26 through the bus in the P I/O 14. The contents of the register 26 are sent to the ALU 9 through the switch 8, the contents of the accumulator 11 are sent to the ALU 9 through the switch 6, and thus an arithmetic operation is performed for these contents. The result of the arithmetic operation is set in the accumulator 11, or sent to the control circuit 3 through the switch 7. It is to be noted that the switches 6, 7 and 8 have been set to the 6a-side, 7a-side and 8a-side, respectively, under the control of the control circuit 3.

In the case where the instruction $I_k$ is an instruction for sending a control signal to the P I/O 14, the switch 7 is set to a 7b-side under the control of the control circuit 3, and the result of an arithmetic operation which is performed for the contents of the accumulator 17 by the ALU 9, is sent through the switch 7 to that position in the P I/O 14 which is specified by the P I/O address 101.

Now, let us suppose that the next instruction $I_{k+1}$ is of the register-modified addressing mode type. The instruction $I_{k+1}$ is set in the instruction register 12 by the calculation completion signal 104 for the instruction $I_k$, and thus the POF part of the register 12 takes a level of "0". This level appears on the signal line 17, and is inverted by the NAND gate 23. Thus, the output signal of the NAND gate 23 takes a level of "1", and sets the switch 27 to a 27b-side. The control circuit 3 decodes the OP part and POF part of the instruction register 12, and delivers an address calculation command 105 to a signal line 105, to set the switches 6 and 8 to the 6b-side and 8b-side, respectively. Thus, the ALU 9 adds the contents of the ADDR part of the instruction register 12 to the contents of a register which is selected from the index register group 5 by the IX part of the instruction register 12. The result of addition is set in the address register 10 at the falling edge of the address calculation command 105. The contents of the register 10 are sent, as a P I/O address, to the P I/O 14, by the next clock pulse. When the instruction $I_{k+1}$ is an instruction for reading out an operand from the P I/O 14, the operand is read out from the P I/O 14 at the above-mentioned address. The register modification instructing signal 102 which is outputted from the control circuit 3 in accordance with the "0" level of the POF part of the instruction register 12, is sent to the differentiating circuit 24 through the NAND gate 23. The register modification instructing signal 102 takes a level of "0" for a period corresponding to two clock pulses of the fundamental clock signal 100. During this period, an output signal 106 from the NAND gate 23 takes a level of "1". When the above period terminates, the signal 102 takes a level of "1", and the level of the output signal 106 is changed from "1" to "0". Thus, the differentiating circuit 24 generates an inverted differentiated signal 107, which is given to the register 26 through the OR gate 25, to set the operand read out from the P I/O 14, in the register 26. The switches 6 and 8 have been set to the 6a-side and 8a-side, respectively, on the basis of a command from the control circuit 3. Accordingly, the contents of the register 26 are added to the contents of the accumulator 11 by the ALU 9. Thus, the processing of the instruction $I_{k+1}$ is completed.

When the instruction $I_{k+1}$ is an instruction for sending a control signal to the P I/O 14, the P I/O address 101 is sent to the P I/O 14, and the contents of the accumulator 11 are sent to the P I/O 14 through the ALU 9 and switch 7.

Figure 3A:
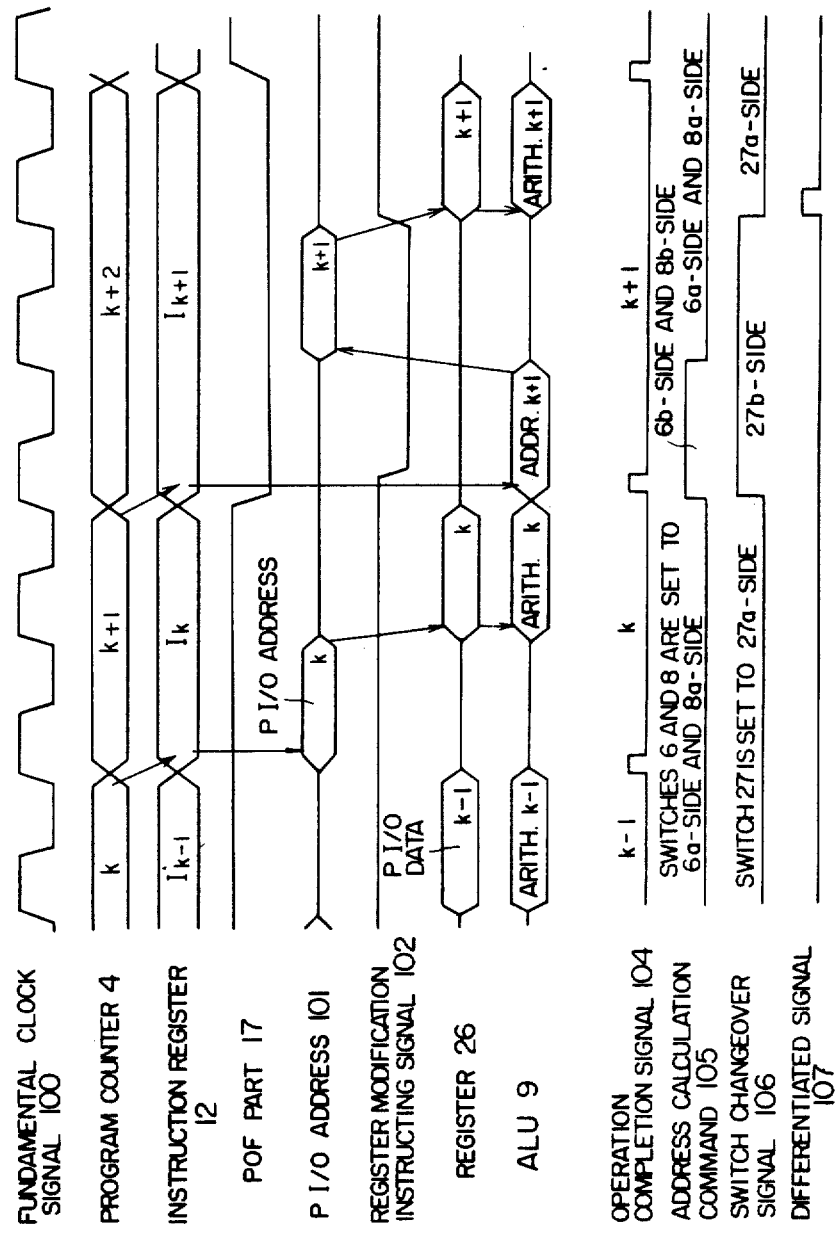

As is apparent from the time chart shown in FIG. 3a, in the case where instructions for reading out an operand from the P I/O 14 are processed, an instruction capable of carrying out direct addressing is discriminated from others, and the P I/O 14 is accessed without carrying out any address calculation. That is, the processing of the instruction is completed in a period corresponding to two clock pulses of the fundamental clock signal 100. While, an instruction requiring address modification is processed for a period corresponding to three clock pulses of the clock signal 100. That is, the processing time of the instruction capable of carrying out direct addressing is two-thirds the processing time of the instruction requiring address modification, and moreover the burden cast on the ALU 9 is reduced by direct addressing.

Next, the embodiment of FIG. 2 in the case where the instruction register 18 is additionally provided to carry out pipeline processing, will be explained with reference to the time chart shown in FIG. 3b. In the case where the instruction register 18 is provided, the following processing is carried out in the present embodiment. When an instruction set in the instruction register 12 is of the direct addressing mode, an address specified by the ADDR part of the instruction is sent, as the P I/O address 101, to the P I/O 14, to specify an address in the P I/O 14. When an arithmetic operation for the preceding instruction set in the instruction register 18 is completed, an operand is fetched from the P I/O 14 to the register 26. Further, at this time, the instruction set in the instruction register 12 is transferred to the instruction register 18, and the next instruction read out from the program memory 13 is set in the instruction register 12. At the same time as an arithmetic operation is performed for the instruction set in the instruction register 18, an address specified by the ADDR part of the next instruction set in the instruction register 12 is sent to the P I/O 14, if the next instruction is of the direct addressing mode. That is, an address in the P I/O 14 is specified to prepare for an arithmetic operation performed after the next instruction has been transferred to the instruction register 18. As mentioned above, the processing that an instruction capable of carrying out direct addressing is discriminated from others and the P I/O 14 is directly addressed, is carried out in the pipeline method. Accordingly, the processing time of the CPU 1 is further shortened, as compared with the case where the instruction register 18 is omitted.

Now, let us suppose that the program counter 4 reads out an instruction $I_k$ from the k-th address of the memory 13. When the calculation completion signal 104 is issued, the instruction register 12 latches the read-out instruction $I_k$. In the case where the instruction $I_k$ is of the direct addressing mode, the ADDR part of the instruction $I_k$ is sent, as the P I/O address 101, to the P I/O 14, to read out an operand therefrom. In more detail, since the instruction $I_k$ is of the direct addressing mode, the POF part of the instruction register 12 takes the level of "1", and therefore the switch 27 is set to the 27a-side. Thus, the ADDR part of the instruction register 12 is sent to the P I/O 14 through the switch 27, to read out the operand. The operand read out from the P I/O 14 is latched by the register 26 when the next calculation-completion signal 104 is issued. At the same time as the above operation, the instruction $I_k$ set in the instruction register 12 is transferred to the instruction register 18.

The OP part and POF part of the instruction register 18 are sent to the control circuit 3, which decodes the above parts and sends an arithmetic operation command 103 to the ALU 9. The ALU 9 performs a predetermined arithmetic operation between the contents of the register 26 and the contents of the accumulator 11, in response to the command 103. The result of the arithmetic operation is latched by the accumulator 11, when the next calculation-completion signal 104 is issued.

At the same time as the instruction $I_k$ is transferred from the instruction register 12 to the instruction register 18, the next instruction $I_{k+1}$ from the program memory 13 is set in the instruction register 12.

In the case where the instruction $I_k$ is an instruction for sending control information to the P I/O 14. The contents of the accumulator 11 are sent to that position in the P I/O 14 which is specified by the P I/O address 101, through the ALU 9 and switch 7.

Referring to FIG. 3b, each of the instructions $I_{k-2}$, $I_{k-1}$ and $I_k$ is of the direct addressing mode, and arithmetic operations for these instructions are completed at an interval of a time corresponding to one clock pulse, since the pipeline processing is carried out by using the instruction registers 12 and 18. In other words, these instructions are processed at an interval of a time corresponding to one clock pulse, in a flow process. The ALU 9 performs a single arithmetic operation for each of these instructions.

Now, let us suppose that the instruction $I_{k+1}$ set in the instruction register 12 is of the register-modified addressing mode. Then, the POF part of the register 12 takes the level of "0", and the switch 27 is set to the 27b-side. When the next calculation-completion signal 104 is generated on the basis of the fundamental clock signal 100, the instruction $I_{k+1}$ is transferred to the instruction register 18, and the OP part and POF part (put in the "0" level) of the register 18 are decoded by the control circuit 3. As a result of the decoding, the control circuit 3 delivers the address calculation command 105, to set the switches 6 and 8 to the 6b-side and 8b-side, respectively. Thus, the ALU 9 adds the contents of the ADDR part of the instruction register 18 to the contents of a register 5 specified by the IX part of the register 18, to carry out address calculation. The result of the addition is latched by the address register 10 at the falling edge of the address calculation command 105. When the next clock pulse of the fundamental clock signal 100 is generated, an operand is read out from that address in the P I/O 14 which is specified by the address register 10. The ALU 9 does not operate for a period between the falling edge of the address calculation command 105 and the time when the above clock pulse is generated. As a result of the decoding of the instruction $I_{k+1}$, the register modification instructing signal 102 is kept at a level of "0" for the address calculation period and the resting period of the ALU 9, that is, for a period corresponding to two clock pulses. Thereafter, the signal 102 takes a level of "1". The register modification instructing signal 102 is applied to the NAND gate 23, which delivers the output signal 106. The differentiating circuit 24 generates the differentiated signal 107 at the falling edge of the signal 106. The signal 107 is applied to the register 26 through the OR gate 25, and thus the operand read out from the P I/O 14 is latched by the register 26. When the next clock pulse of the fundamental clock signal 100 is generated, an arithmetic operation based upon the OP part of the instruction $I_{k+1}$ is carried out, and thus the processing of the instruction $I_{k+1}$ is completed. The calculation-completion signal 104 is not generated for a period when the instruction $I_{k+1}$ is processed (that is, for a period corresponding to three clock pulses), and therefore the operations of the program counter 4 and operation registers 12 and 18 are stopped for the above period, to prepare for the next processing. When the instruction $I_{k+1}$ is an instruction for sending control information to the P I/O 14, the contents of the accumulator 11 are sent to that address in the P I/O 14 which is specified by the contents of the address register 10, through the ALU 9 and switch 7.

As shown in FIG. 3b, a period corresponding to three clock pulses elapses between the completion of the arithmetic operation for the instruction $I_k$ and the completion of the arithmetic operation for the instruction $I_{k+1}$. While, in the case where an instruction capable of carrying out direct addressing is discriminated from others and an operand is read out from the P I/O 14 by the direct addressing method, the instruction can be processed in a period corresponding to one clock pulse, as mentioned previously. That is, an instruction taking the direct addressing mode can be processed in a far shorter period and casts a lighter burden on the ALU 9, as compared with an instruction requiring address modification.

Figure 4:
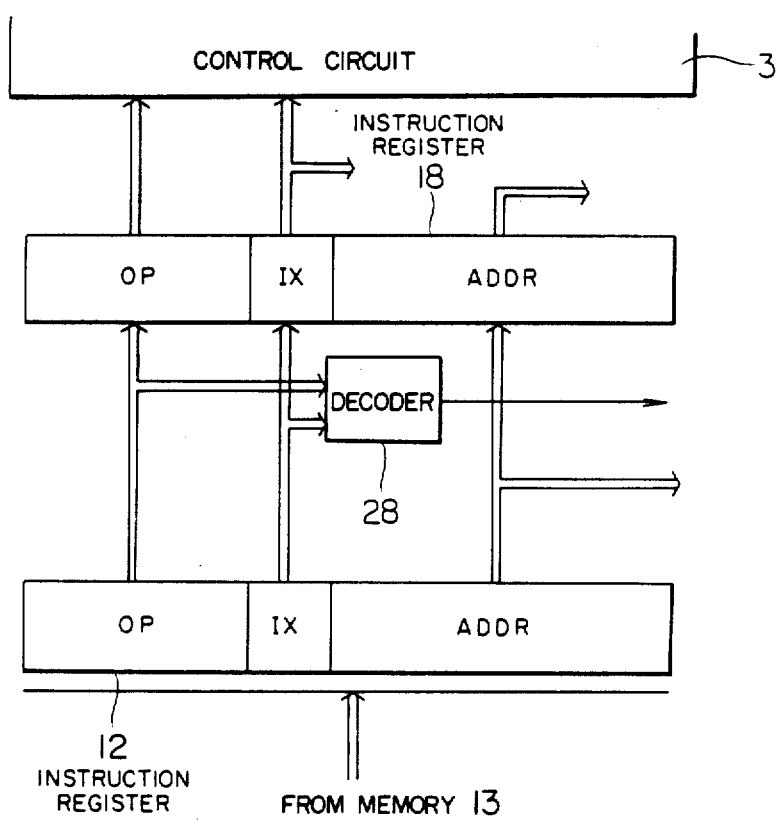
FIG. 4 is a block diagram showing part of another embodiment of a programmable controller according to the present invention.

FIG. 4 shows part of another embodiment of a programmable controller according to the present invention. In the present embodiment, an instruction does not have a POF part, but the POF part is substantially included in the IX part of the instruction. Accordingly, a decoder 28 for decoding the IX part is additionally provided, and the output of the decoder 28 is applied to the NAND gate 23. The present embodiment has an advantage that the POF part is not required at each of the instructions contained in a program.

Figure 5:
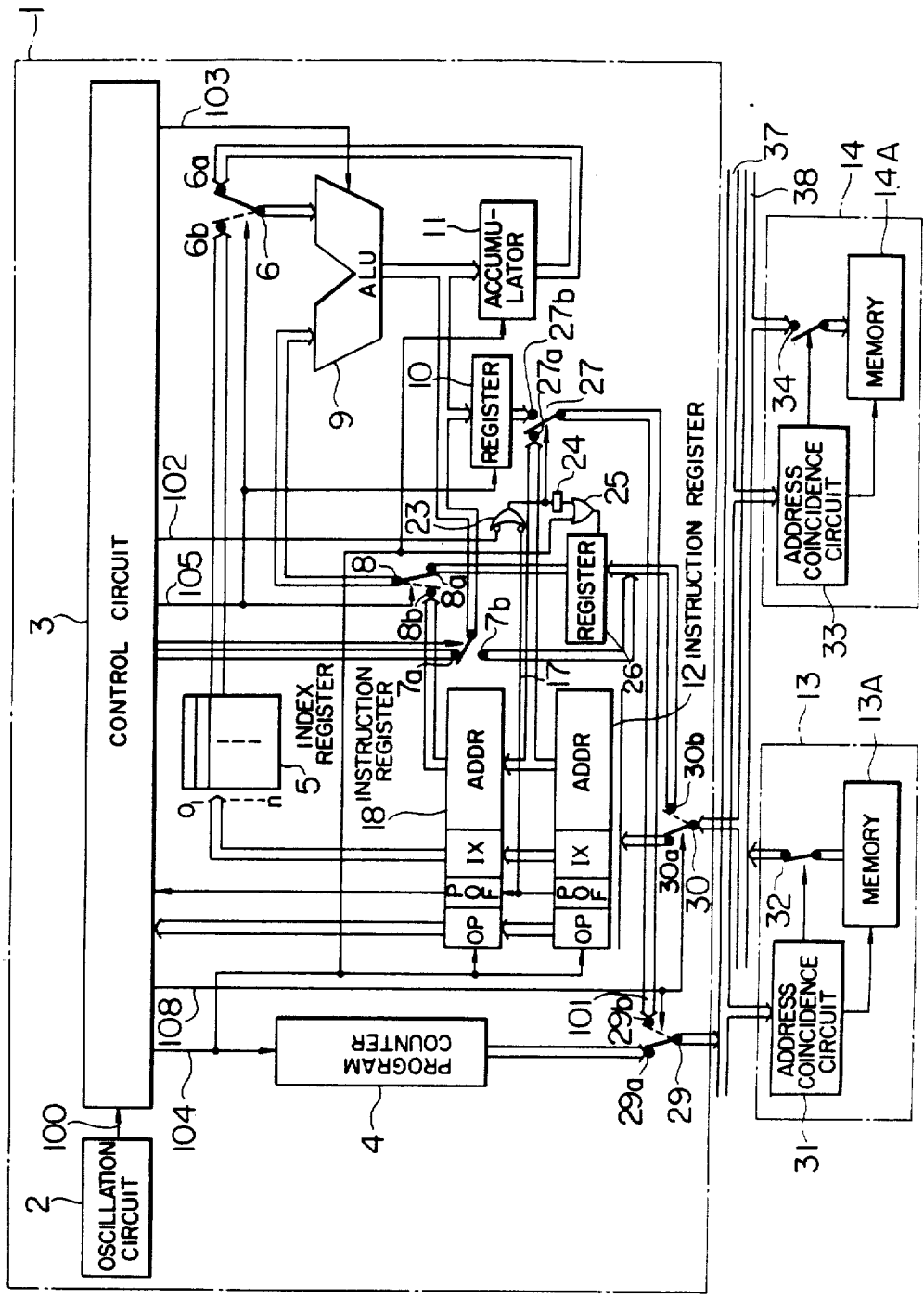
FIG. 5 is a block diagram showing a further embodiment of a programmable controller according to the present invention.

FIG. 5 shows a further embodiment of a programmable controller according to the present invention. In the present embodiment, the CPU 1 is connected to the memory 13 for storing therein a program and the P I/O 14, through common buses.

Referring to FIG. 5, the memory 13 and P I/O 14 are connected to common buses 37 and 38. The common bus 37 is an address bus, and the common bus 38 is a data bus. Further, switches 29 and 30 are provided in the CPU 1. Either the output of the program counter 4 or the output of the switch 27 is sent to the address bus 37 by the switch 29, and either the instruction register 12 or each of the register 26 and switch 7 is connected to the data bus 38 by the switch 30. The set position of each of the switches 29 and 30 is controlled by the control circuit 3. The memory 13 has an address coincidence circuit 31 and a switch 32, in addition to a basic memory 13A. The P I/O 14 has an address coincidence circuit 33 and a switch 34, in addition to a basic P I/O 14A. The address coincidence circuits 31 and 33 discriminate whether an address from the address bus 37 is an address in the memory 13A or an address in the P I/O 14A. When any of the address coincidence circuits 31 and 33 receives an appropriate address, the memory 13 or P I/O 14 is accessed, and a corresponding one of the switches 32 and 34 is turned on.

FIG. 6 is a time chart for explaining the operation of the embodiment shown in FIG. 5. Referring to FIG. 6, the address bus 37 and data bus 38 are alternately put in an operating state by a bus changeover signal 108. Further, since an instruction and an operand are alternately read out, the processing at each of the program counter 4, instruction registers 12 and 18, and register 26 is carried out at an interval of a period corresponding to two clock pulses of the fundamental clock signal 100. Other operations shown in FIG. 6 are identical with those shown in FIG. 3b. FIG. 6 shows only the case where an instruction of the direct addressing mode (namely, an instruction whose POF part has a value of "1") is processed. However, in the case where an instruction of the register-modified addressing mode is processed, the present embodiment will operate in the same manner as shown in FIG. 3b for the case where an instruction requiring address modification is processed, except that each processing or arithmetic operation is performed for a period corresponding to two clock pulses of the fundamental clock signal.

Although the present embodiment is lower in processing speed, as compared with the embodiment shown in FIG. 2, the processing speed of the present embodiment is 1.5 times that of the conventional programmable controller. Further, according to the present embodiment, the total number of words included in control signals for instructing the signal transfer between the CPU 1 and each of the memory 13 and P I/O 14 can be reduced.

What is claimed is:

1. A programmable controller for controlling the operations of a plant on the basis of a stored program, comprising:

memory means for storing therein a program, said program containing an instruction taking a register-modified addressing mode as an addressing mode of an operand and an instruction taking a direct addressing mode as the addressing mode of an operand, each of said instructions being read out from said memory means in response to receipt of a corresponding memory address;

a processing unit provided with operating means for supplying an address to said memory means to read out an instruction from said memory means and for performing an arithmetic operation in accordance with said read-out instruction to control a process, including an instruction register for storing an instruction read out from said memory means, means for determining by the contents of the instruction stored in said instruction register whether said instruction is an instruction taking the register-modified addressing mode or an instruction taking the direct addressing mode, a plurality of index registers, an arithmetic circuit, switching means for delivering an address as address information for controlling a plant in such a manner that, when the instruction stored in said instruction register is of the register-modified addressing mode, the contents of an index register specified by an index part of said instruction are added to an address indicated by the address part of said instruction by said arithmetic circuit and the result of addition is delivered as address information for controlling a plant, and when said instruction is of the direct addressing mode, an address indicated by an address part of said instruction is directly delivered as address information to said plant, and control circuit means for controlling said switching means in accordance with said determining means and for controlling said arithmetic circuit to operate on state information received from the plant in response to an address supplied to the plant via said switching means to produce control information to perform control operations in accordance with a command from an operation code part of the instruction read out from said memory means and stored in said instruction register; and a process input/output unit disposed between said processing unit and said plant and responsive to said plant control address information from said processing unit for sending control information which is outputted from said processing unit to a plant specified by said address information and for sending state information which is inputted from said plant to said processing unit.

2. A programmable controller according to claim 1, wherein said instruction register of said processing unit includes a first instruction register for storing the instruction readout from said memory means, and a second instruction register connected to said first instruction register for receiving an instruction transferred from said first instruction register, and wherein when the instruction read out from said memory means and set in said first instruction register is of the direct addressing mode, said control circuit means controls said switching means to deliver an address indicated by the address part of said instruction as address information directly to said plant and then controls said first and second instruction registers to transfer said instruction from said first instruction register to said second instruction register and controls said arithmetic circuit to perform an arithmetic operation based upon said instruction and also reads out the next instruction from said memory means to set said next instruction in said first instruction memory.

3. A programmable controller according to claim 1, wherein each of the instructions read out from said memory means has, at a part thereof, a code for indicating whether the instruction takes the register-modified addressing mode or the direct addressing mode, and said determining means determines the mode of the instruction on the basis of said code.

4. A programmable controller according to claim 1, wherein it is indicated by the index part of each instruction read out from said memory means whether the instruction takes the register-modified addressing mode or the direct addressing mode, and said determining means determines the mode of the instruction on the basis of the index part of the instruction.

5. A programmable controller according to claim 1, wherein information is transferred between said processing unit and each of said memory means and said process input/output unit through a common bus.

* * * * *